United States Patent Office 2,982,733
Patented May 2, 1961

2,982,733

MODIFIED ORGANIC FLUIDS OF THE GLYCOL TYPE AND METHODS OF PRODUCING THE SAME

John H. Wright, Berkley, Mich., and Lowell L. Petterson, Whittier, and Howard Steinberg, Fullerton, Calif., assignors, by direct and mesne assignments, to United States Borax & Chemical Corporation, Los Angeles, Calif., a corporation of Nevada No Drawing. Original application Mar. 5, 1957, Ser. No. 643,923. Divided and this application Nov. 24, 1958, Ser. No. 775,699

6 Claims. (Cl. 252—75)

This application is a division of our application Serial No. 643,923, filed March 5, 1957, for "Modified Organic Fluids of the Glycol Type and Methods of Producing the Same."

This invention relates to methods for improving the physical and/or chemical properties of organic fluids such as glycols and ethers of glycols, and to the compositions produced thereby. It especially relates to organic compositions of this type in a form for use as additives to similar or other organic fluid compositions for obtaining one or more of the improved properties and in desired degree.

Glycols and ethers of glycols and mixtures of either or both are widely used, for example, as hydraulic fluids, as heat exchange fluids, for instance cooling fluids for internal combustion engines, and for like and other purposes. It is well known that corrosion of metals by these fluids is a problem and that such corrosion by many organic fluids including certain of these glycols such as ethylene, diethylene, propylene, dipropylene and triethylene glycols can be to some extent buffered or inhibited by directly adding thereto a minor proportion of an alkali metal or alkaline earth metal borate which must be soluble in the glycol, such as sodium or calcium tetraborate in the form of a solid decahydrate or pentahydrate, i.e., a borate having water of hydration.

However, such known procedures have the serious disadvantage of introducing an appreciable amount of water of hydration into the resultant composition which is part of the formulation but active as free water. Such water of hydration in undesirable under many practical conditions of use. In particular, such water of hydration tends to increase the vapor pressure of the organic fluid composition and to lower its boiling point, both of which are serious disadvantages when the organic fluid composition is to be used under conditions of high temperature because they contribute to causing vapor lock. Moreover, such water of hydration when in the vapor phase may itself cause corrosion to certain metals when brought into intimate contact therewith. In addition, there are many organic fluids such as ethers of glycols in which the aforesaid borates, as such, are either insoluble or may form insoluble complexes and which have not heretofore lent themselves to direct borate treatment. Furthermore, in the case of hydraulic fluids which normally are constituted of a mixture of glycol and ethers of glycol, the known procedures for adding borate to the fluid have required the use of such large amounts of glycol that the viscosity of the resultant hydraulic composition may be adversely affected by an increase thereof at low temperatures. Also the volatility of the composition may be adversely increased at high temperatures and such composition may effect a volumetric change in rubber with which it comes in contact.

A primary purpose of the present invention is to make possible new and improved organic fluid compositions avoiding one or more of the above difficulties and which may be of improved non-corrosive character and to produce such improved compositions in a form suitable as additives to conventional organic fluid compositions for imparting their improved physical and/or chemical properties thereto.

Another broad purpose of the present invention is to provide suitable metallic organic additives for organic fluids which are useful wherever alkalinity or buffering action is required to thereby improve the physical or chemical properties of such organic fluids.

A related object is to provide a process for treating glycols of the type of ether glycols and hexylene glycol in which a borate is normally insoluble or only slightly soluble, in a manner to obtain a substantial concentration of borate therein.

A more particular object of the invention is to provide a liquid borate complex that may conveniently be added to organic fluids of the described types to provide them with improved corrosion inhibiting properties. These corrosion inhibiting liquid compositions of the invention will be directly miscible in all useful proportions with many organic fluids, including in particular glycols, ethers of glycols and mixtures of either or both, of the type ordinarily used for hydraulic fluids, anti-freeze cooling fluids for internal combustion engines, and like and other purposes.

A further object of our invention is to provide a glycol additive high in borate concentration which may be added to an organic fluid such as an ether of glycol to form a functional hydraulic fluid without adversely affecting the viscosity of the functional fluid at relatively low temperatures, without adversely affecting its volatility at high temperatures, and which will control the rubber swelling characteristics of the functional fluid.

Still another object is to provide a process of obtaining suitable concentrations of borate in a mixture of organic fluids including a glycol and without effecting a substantial loss of glycol by evaporation.

A specific object is to provide a glycol-borate condensation complex from which the water of hydration of the borate reactant has been substantially or entirely removed.

Another specific object is to provide a glycol-borate composition complex containing only water formed by chemical combinations, i.e., water of condensation.

Still another object is to provide a hydraulic fluid composition including a glycol-borate condensation complex which will be applicable to high temperature applications without causing vapor lock.

Other objects and advantages of the invention will appear as the description progresses.

When the compositions of the invention are used as additives for organic fluids, they will preferably contain a relatively high concentration of borate, the extent of which will be determined by the application for which the additive is intended. Typically this may be between about 3 to about 40% by weight. The higher the concentration, the correspondingly more effective will the additive be and correspondingly lesser proportions of the additive will be required for making up a final working composition. For example, where effective resistance to corrosion is desired, a concentration of about 15% to about 35% of the borate is a desirable range for a practical and economical additive. It will be understood, however, that such concentrations may be increased or decreased. In fact the concentration may be such that the additive itself may constitute the final or working composition although for reasons of evaporation hereinafter noted, such is not preferred.

We have discovered that tetraborates and metaborates of the alkali metals and of the alkaline earth metals can be caused to react with glycols containing from 2 to 6 carbon atoms, for example, ethylene glycol $$[HOCH_2CH_2OH]$$

diethylene glycol (di-2-hydroxyethyl ether)

$$[HOCH_2CH_2OCH_2CH_2OH]$$

triethylene glycol $[HOCH_2CH_2OCH_2CH_2OCH_2CH_2OH]$ propylene glycol (1,2-propanediol)

$$[CH_3CH(OH)CH_2OH]$$

hexylene glycol (2-methyl-2,4-pentanediol)

$$[CH_3COH(CH_3)CH_2CHOHCH_3]$$

2,3-butanediol $[CH_3CHOHCHOHCH_3]$, 1,4-butanediol $[CH_2OHCH_2CH_2CH_2OH]$, and with commercial monoalkyl ethers of such glycols (the alkyl group of the monoalkyl ethers containing from one to four carbon atoms) containing a glycol as a diluent and with which the borate may react, to form condensed products with release of water of hydration and/or of condensation depending upon the conditions of the reaction and the character of the borate; and that by proper control of such reaction it is possible to produce compositions which are remarkably useful as functional fluids or additives, for instance corrosion inhibiting additives. Ethylene and diethylene glycols are preferred because of their ability to combine with greater concentrations of borate.

We have found that when the described organic glycol and borate reactants are mixed and heat reacted in a mole ratio of glycol to borate of from about three to one to about twelve to one, widely varying quantities of water may be removed by evaporation and/or condensation. The water removed may approach, and in some instances may equal, the maximum water theoretically available from the reaction, i.e., the total water of hydration of the borate reactant plus one mole of water for each mole of glycol. For example, where one mole of sodium tetraborate pentahydrate and 5 moles of ethylene glycol are the reactants, it is possible to remove by the reaction, 10 moles of water. This is shown by the following equation thus:

One mole of $Na_2B_4O_7 \cdot 5H_2O + 5$ moles $HOCH_2CH_2OH_2 \rightarrow$
$[(Na_2B_4O_7)5(-CH_2CH_2O)] + 10$ moles $H_2O$ A range of products may thus be produced depending upon the extent of water removal and varying typically from substantially non-adherent liquids that are viscous but readily pourable at room temperature, to brittle solids readily pourable at higher temperatures at or below 100° C. and also soluble in organic fluids such as glycols or ethers of glycols.

A more particular aspect of the present invention is concerned with condensed compositions of the described type which are effectively homogeneous liquids at normal or moderately elevated temperatures and which are readily miscible with glycol and other fluids of the described type.

The products of the present invention are characterized by the presence of alkali metal or alkaline earth metal in a definite proportion to the boron, and are thereby distinguished from previously known condensation products of alcohols with boric acid, for example. The products are also characterized by the initial presence of only one or two hydroxyl groups per molecule of the initial organic compound, in contrast to previously known reactions of alkali metal borates with polyfunctional configurations containing more than two hydroxyl groups.

The products of the invention may be produced by stirring together solid alkali metal or alkaline earth metal tetraborate or metaborate and a glycol containing from two to six carbon atoms, inclusive, and subjecting the mixture to elevated temperature and reduced pressure to remove water therefrom. At a temperature of about 75 to 125° C., for example, appreciable condensation of the reactants typically takes place in a few minutes, and the released water may be removed by maintaining a pressure of 10 to 30 mm. of Hg. Condensation products may be prepared in the same manner from a borate and a monoalkyl ether of a glycol, such for example, as diethylene glycol monoethyl ether containing a straight glycol in sufficient amount to carry the reaction, such as a commercial monoalkyl ether containing ethylene glycol as a diluent.

A further feature of the present invention is the discovery that many condensation products of the type described may be prepared without physically removing water from the reaction mixture of borate and organic compound. Such may be accomplished by employing a form of borate which is substantially or completely dehydrated, for example, anhydrous sodium tetraborate. The water produced by condensation reaction of the borate and glycol is then apparently taken up by the borate-glycol condensation complex.

The preferred compositions of the present invention for use as an additive composition for glycol and other organic fluids and especially where corrosion inhibiting is desirable are those which do not contain more water than corresponds to the water formed in condensation of the borate and glycol or glycol derivatives, for example, ethers of glycols made by processes which may or may not involve the formation of glycols as an intermediate. Such compositions result when the initial reactants do not contain any water of hydration, or when an amount of water at least equal to the water of hydration of the borate reactant is removed in preparation of or formation of the condensed composition.

We have discovered that it is possible to prepare condensed products which contain less than the preferred maximum water content just described and which are nevertheless readily pourable liquids at a convenient working temperature not exceeding about 100° C. Although the minimum water content for such a liquid product varies considerably with the particular initial ingredients chosen, and with the proportions of initial reactant ingredients combined, and the temperatures and pressures employed in the condensation reaction, we have found in general that liquid products are obtainable if the water removed does not exceed the sum of any water of hydration of the initial borate reactant and approximately half of the condensation water corresponding to complete condensation of the borate reactant and the glycol or glycol derivative. Such complete condensation normally releases one mole of water per mole of glycol, or 0.5 mole of water per mole of monoalkyl ether of a glycol.

By controlling the reaction within the limits indicated, it is possible to produce additive compositions containing a minimum amount of water as part of the borate-glycol complex and yet having physical properties that permit accurate and convenient handling and complete dispersal in the organic fluids such as glycols to be treated.

A full understanding of the invention and of its further objects and advantages will be had from the following examples of specific products and of typical processes by which they may be produced. Those examples are intended only for illustration of the invention and not as a limitation upon its scope.

*Example 1.*—Sodium tetraborate pentahydrate and diethylene glycol were mixed in a molar ratio of 1:9 and heated to about 113° C. The pressure was reduced to 18 mm. of Hg and released water was collected in a condenser cooled with ice water. The total water thus collected corresponded to the 5 moles of water of hydration of the tetraborate and approximately 0.5 mole of water per mole of glycol. The condensed reaction product was filtered at about 90° C. through a coarse fritted glass filter. The product was a pale yellow liquid, nearly immobile at room temperature, but pourable when warmed to about 30° C. It was found on analysis to contain 4.08% boron and 4.33% sodium and had a density of 1.28 at 25° C.

*Example 2.*—Sodium tetraborate pentahydrate was mixed with ethylene glycol in a molar ratio of 1:6. Water was removed at a pressure of about 40 mm. of Hg and at a temperature of 75 to 110° C. during a period of 15 minutes. The total amount of water removed corresponded to the 5 moles of water of hydration of the borate plus 0.2 mole of water per mole of glycol. In this preparation the borate dissolved completely, and a clear liquid product was obtained without filtration. The viscosity of the condensed product was similar to that of Example 1, and was 2,300 centistokes at 82° C. The product was found on analysis to contain 7.98% boron and 8.48% sodium and had a density of 1.41 at 25° C.

*Example 3.*—Sodium tetraborate pentahydrate was mixed with triethylene glycol in a molar ratio of 1 to 12. An amount of water corresponding to the initial water of hydration of the borate was removed at 100 to 125° C. and a pressure of 6 to 20 mm. of Hg. After filtration, the condensed product was a clear, readily pourable liquid, miscible in all proportions in ethylene glycol, diethylene glycol and diethylene glycol monoethyl ether such as "Carbitol." It had a density of 1.20 at 25° C. and a viscosity of 3,500 centistokes at 82° C., and was found to contain 2.14% boron and 2.27% sodium.

*Example 4.*—Sodium tetraborate pentahydrate was mixed with hexylene glycol (2-methyl 2,4-pentane-diol) in a molar ratio of about 1 to 7.5. An amount of water was removed corresponding to only the initial water of hydration of the tetraborate. In this and in subsequent Examples 5–7, 9, 10 and 12–16 water removal was carried out at temperatures in the range from 75 to 120° C. and at pressures in the range from 15 to 30 mm. of Hg. After filtration at elevated temperature, the condensed product was a white solid at room temperature, melting at about 35° C.

*Example 5.*—Sodium tetraborate pentahydrate was mixed with 2,3-butanediol in a molar ratio of 1 to 12 at a temperature of approximately 100° C., and an amount of water was removed at reduced pressure corresponding to the initial water of hydration of the tetraborate and 0.25 mole of water per mole of glycol. The resulting condensed product was a translucent syrup which was found on analysis to contain 3.68% boron and 3.92% sodium.

*Example 6.*—The procedure of Example 5 was repeated, but replacing the 2,3-butanediol by 1,4-butanediol and removing only an amount of water corresponding to the water of hydration of the sodium tetraborate pentahydrate. The condensed product was a clear readily pourable liquid.

*Example 7.*—Condensation products of the type described may be made in the manner described using as the borate reactant sodium tetraborate of other degrees of hydration. For example, sodium tetraborate decahydrate was mixed with diethylene glycol in a molar ratio of 1 to 9. After removal of an amount of water corresponding to the initial water of hydration of the borax, the condensed product was a colorless liquid with a density of 1.23 and a viscosity of 14,000 centistokes at 25° C. It was miscible in all proportions in ethylene glycol, diethylene glycol and "Carbitol." Condensation products of sodium tetraborate and ethylene glycol, triethylene glycol, butanediols and hexylene glycol can also be prepared using the sodium tetraborate decahydrate reactant.

*Example 8.*—Anhydrous sodium tetraborate was stirred in ethylene glycol in a molar ratio of 1 to 6 at a temperature of approximately 100° C. without physical removal of water. The resulting condensed product was a liquid, nearly immobile at room temperature, but pourable when warm. The water released by condensation of the tetraborate and glycol was apparently taken up as part of the borate-glycol complex.

*Example 9.*—Anhydrous sodium tetraborate was stirred with ethylene glycol in a molar ratio of 1 to 6, and approximately 0.5 mole of water per mole of glycol was removed in the manner already described. The resulting condensed product was a solid glassy material containing 8.28% boron and 8.68% sodium. When heated to nearly 100° C. it became a pourable fluid.

*Example 10.*—The procedure of Example 9 was repeated, but with a molar ratio of anhydrous borax to ethylene glycol of 1 to 9. Removal of 0.5 mole of water per mole of glycol yielded, after filtration, a condensed product which was a clear syrup containing 6.25% boron and 6.62% sodium.

*Example 11.*—Anhydrous sodium tetraborate was mixed with 2,3-butanediol at a molar ratio of 1 to 12 at a temperature of about 100° C. The resulting condensed product was a clear liquid, which was found to contain 3.25% boron and 3.48% sodium.

*Example 12.*—Condensed products in accordance with the invention may be prepared from borates having a wide range of molar ratio of metal to $B_2O_3$. In particular, such products may be prepared from metaborates, for example, as well as from tetraborates. Condensed products can also be prepared from mixtures of borates, such as mixtures of tetraborates and metaborates. For example, sodium metaborate ($Na_2B_2O_4 \cdot 4H_2O$) was mixed with ethylene glycol at a molar ratio of 1 to 9 and water was removed at approximately 100° C. and at reduced pressure. The total water removed corresponded to the initial water of hydration of the metaborate and 0.33 mole of water per mole of glycol. A condensed product was obtained which was a viscous but mobile colorless liquid at room temperature and which was found to contain 3.64% boron and 7.40% sodium.

*Example 13.*—The procedure of Example 12 was repeated, but employing sodium metaborate and ethylene glycol at a molar ratio of about 1 to 6.6 and removing an amount of water corresponding to only the initial water of hydration of the metaborate. The resulting condensed product, after filtration at 90 to 100° C., was a viscous but mobile pale yellow liquid which was found to contain 4.46% boron and 9.03% sodium.

*Example 14.*—Products in accordance with the invention may be prepared from glycols and any desired alkali metal borate. For example, potassium tetraborate ($K_2B_4O_7 \cdot 4H_2O$) was mixed with diethylene glycol at a molar ratio of 1 to 9, and an amount of water was removed corresponding to the initial water of hydration of the tetraborate and 0.5 mole of water per mole of glycol. The resulting condensed product was a transparent syrup, found to contain 3.97% boron and 7.03% potassium. Condensation products can also be made with potassium tetraborate or metaborate and other glycols, including ethylene glycol, triethylene glycol, butanediols and hexylene glycol.

*Example 15.*—Condensation products in accordance with the invention can also be prepared from alkaline earth metal borate glycols of the described type. As an example, calcium metaborate ($CaB_2O_4 \cdot 6H_2O$) was mixed with ethylene glycol at a molar ratio of approximately 1 to 12. An amount of water was removed substantially corresponding to the water initially present as water of hydration of the metaborate. The resulting condensed product was a viscous but mobile pale yellow liquid and was found to contain 2.37% boron and 4.1% calcium.

*Example 16.*—Condensation products can be made not only with the described glycols, but also with monoalkyl ethers of such glycols which contain a minor proportion of glycol. Such condensation products include those made with the monomethyl ether of diethylene glycol [CH₃OCH₂CH₂OCH₂CH₂OH], the monoethyl ether of diethylene glycol [CH₃CH₂OCH₂CH₂OCH₂CH₂OH], the monoisopropyl ether of diethylene glycol

[(CH₃)₂COCH₂CH₂OCH₂CH₂OH]

and the monobutyl ether of diethylene glycol

[CH₃CH₂CH₂CH₂OCH₂CH₂OCH₂CH₂OH]

For example commercial diethylene glycol monoethyl ether containing some ethylene glycol as a diluent was mixed with sodium tetraborate pentahydrate at a molar ratio of tetraborate to ether equal to 1 to 6.55. An amount of water corresponding to the initial water of hydration of the tetraborate was removed at elevated temperature and reduced pressure. The resulting condensed product was a clear liquid and was found to contain 3.08% boron and 3.26% sodium.

Most of the illustrative condensation products that have been described are liquid at room temperature, and all are liquid and readily pourable at a working temperature that does not exceed about 100° C. Moreover, the described liquid compositions are found to be readily miscible in concentrations up to at least 25% by weight and usually in all proportions, in glycols and glycol derivatives such as ethers of glycol that are ordinarily employed in hydraulic and coolant fluids, including in particular ethylene glycol, diethylene glycol and diethylene glycol monoethyl ether.

It is of particular interest that in preparation of a condensed product of the described type from a hydrated borate and a glycol or glycol derivative, water removal typically proceeds smoothly and without discontinuity or other abnormality through the point which corresponds to complete removal of any initial water of hydration. Moreover, so far as has been ascertained, the nature of the condensed product is independent of the degree of hydration of the initial ingredients, provided, of course, that the amount of water removed is adjusted correspondingly.

We have discovered that condensed compositions of the type described are particularly valuable for improving the properties of many types of organic fluids in which they are readily miscible. As an example, addition to such fluids of suitable proportions of the condensed compositions of the invention has been found to inhibit corrosion at least as effectively as a corresponding amount of a hydrated alkali metal or a hydrated alkaline earth metal borate, while avoiding the disadvantages previously associated with use of the latter compounds. In particular, use of the compounds of the invention greatly reduces or eliminates the introduction into the organic fluid of water such as is typically contained as water of hydration in those borates that were otherwise suitable for the described use. Moreover, the difficulties of obtaining complete solution of a solid additive are entirely avoided by utilizing the compositions of the invention, which are fluid either at room temperature or at a moderately elevated working temperature. Such fluid compositions can be metered accurately and conveniently, and are readily miscible in many organic fluids in which solid borates are either insoluble or only very slowly soluble. The most desirable concentration of the additive composition in the glycol fluids, although varying considerably with many factors, such as the proportion of borate in the additive composition and the type of service for which the treated glycol fluids are intended, is usually between about 0.2% and about 10% by weight. Hydraulic fluids made from higher polyglycols may also be effectively treated in the same manner to render them substantially non-corrosive.

The following are typical examples of applications utilizing the additive composition of the invention:

*Example 17.*—A brake fluid in which corrosion was inhibited effectively by the additive composition of the invention was prepared by mixing substantially equal volumes of ethylene glycol monobutyl ether, diethylene glycol monoethyl ether and a polyalkylene glycol lubricant such as "Ucon" 50–HB–660 made by Carbide and Carbon Chemical Company and adding to this mixture with agitation from about 1% to about 5% by weight of the total brake fluid composition of an additive composition of the invention made in accordance with Example 1.

*Example 18.*—A hydraulic fluid was prepared by mixing by volume 10 parts of ethylene glycol, 70 parts of dipropylene glycol methyl ether and 20 parts of polyalkylene glycol lubricant such as polyglycol 15–200 made by Dow Chemical Company and adding to this mixture with agitation from about 1% to about 5% by weight of the total fluid composition of the additive composition made in accordance with Example 14. The resultant fluid has effective corrosion inhibiting properties.

*Example 19.*—A hydraulic fluid was prepared by mixing by volume 60 parts of diethylene glycol monoethyl ether, 10 parts of diethylene glycol monobutyl ether, 25 parts of a polyalkylene glycol lubricant such as "Ucon" 50–HB–660, 3 parts diethylene glycol and 2 parts of the additive composition made in accordance with Example 14. The resultant fluid has effective corrosion inhibiting properties and is particularly applicable to uses as a hydraulic window lift fluid or a brake fluid.

*Example 20.*—In certain exceptional cases it may be desired to directly produce the functional organic fluid composition of the invention without employing the above-described additive compositions. This can be done by reacting such ratios of borate compounds and glycols and their derivatives described above such that the resultant composition will itself be one having the relative molar ratio of organic compound to borate compound obtained for example in a composition such as described in Example 17 wherein an additive composition of the invention is combined with an organic fluid. Effective results are typically obtainable with a molar ratio of organic compound to borate compound between 50 and 400. This procedure is not however preferred since a disadvantage of it is the possible loss of organic fluids of the glycol type during processing and the need for processing large volumes of fluid by a continuous process or by large processing equipment.

Thus equal parts by volume of diethylene glycol monobutyl ether, diethylene glycol monoethyl ether and a polyalkylene glycol such as "Ucon" 50–HB–660 and one percent by weight of these, of sodium tetraborate decahydrate were mixed and heated to a temperature between 150° and 175° C. under a vacuum of approximately 10 inches of mercury, by a continuous process until approximately all of the water of hydration of the borate reactant was evaporated. The resultant product was one that could be used directly as a hydraulic fluid and had corrosion resistant properties. It has a molar ratio of organic compound to borate compound of approximately 200 to 1 and is a readily pourable liquid at normal atmospheric temperatures.

Other modes of applying the principle of the invention may be employed provided the features stated in any of the following claims or the equivalent of such be employed.

We, therefore, particularly point out and claim as our invention:

1. A substantially water-free organic hydraulic fluid composition inhibited against metal corrosion, consisting essentially of at least one material selected from the group consisting of glycols, ethers of glycols and mixtures thereof and from about 0.2 to about 10% by weight of a corrosion inhibiting additive, said additive consisting essentially of a condensation product of an organic compound and a borate compound, said organic compound being selected from the class consisting of glycols containing from 2 to 6 carbon atoms and mixtures of glycols containing from 2 to 6 carbon atoms with monoalkyl ethers of glycols containing from 2 to 6 carbon atoms, the alkyl group of said monoalkyl ethers containing from 1 to 4 carbon atoms, said borate compound being selected from the group consisting of alkali metal tetraborates and metaborates and alkaline earth metal tetraborates and metaborates, the molar ratio of organic compound to borate compound in said condensation product being from about 3:1 to about 12:1, the water content of said condensation product not substantially exceeding the water formed in condensation of said compounds, and said condensation product being a substantially homogeneous and readily pourable liquid at a temperature less than about 100° C.

2. A corrosion-inhibited hydraulic brake fluid composition consisting essentially of about equal volumes of ethylene glycol monobutyl ether, diethylene glycol monoethyl ether, a polyalkylene glycol and from about 1 to about 5% by weight of the condensation product of an organic compound and a borate compound, said organic compound selected from the class consisting of glycols containing from two to six carbon atoms and mixtures of glycols containing from two to six carbon atoms with monoalkyl ethers of glycols containing from two to six carbon atoms, the alkyl group of said monoalkyl ethers containing from one to four carbon atoms, said borate compound selected from the group consisting of alkali metal tetraborates and metaborates and alkaline earth metal tetraborates and metaborates, the molar ratio of organic compound to borate compound in said condensation product being from about three to one to about twelve to one, the water content of said condensation product not substantially exceeding the water formed in condensation of said compounds, and said condensation product being a substantially homogeneous and readily pourable liquid at a temperature less than about 100° C.

3. A corrosion-inhibited hydraulic brake fluid composition consisting essentially by volume of about 10 parts of ethylene glycol, 70 parts of dipropylene glycol methyl ether, 20 parts of a polyalkylene glycol and from about 1 to about 5% by weight of the condensation product of an organic compound and a borate compound, said organic compound selected from the class consisting of glycols containing from two to six carbon atoms and mixtures of glycols containing from two to six carbon atoms with monoalkyl ethers of glycols containing from two to six carbon atoms, the alkyl group of said monoalkyl ethers containing from one to four carbon atoms, said borate compound selected from the group consisting of alkali metal tetraborates and metaborates and alkaline earth metal tetraborates and metaborates, the molar ratio of organic compound to borate compound in said condensation product being from about three to one to about twelve to one, the water content of said condensation product not substantially exceeding the water formed in condensation of said compounds, and said condensation product being a substantially homogeneous and readily pourable liquid at a temperature less than about 100° C.

4. A corrosion-inhibited hydraulic brake fluid composition consisting essentially by volume of about 60 parts of diethylene glycol monoethyl ether, 10 parts of diethylene glycol monobutyl ether, 25 parts of a polyalkylene glycol and 2 parts of the condensation product of an organic compound and a borate compound, said organic compound selected from the class consisting of glycols containing from two to six carbon atoms and mixtures of glycols containing from two to six carbon atoms with monoalkyl ethers of glycols containing from two to six carbon atoms, the alkyl group of said monoalkyl ethers containing from one to four carbon atoms, said borate compound selected from the group consisting of alkali metal tetraborates and metaborates and alkaline earth metal tetraborates and metaborates, the molar ratio of organic compound to borate compound in said condensation product being from about three to one to about twelve to one, the water content of said condensation product not substantially exceeding the water formed in condensation of said compounds, and said condensation product being a substantially homogeneous and readily pourable liquid at a temperature less than about 100° C.

5. A corrosion-inhibited organic coolant fluid suitable for use in aqueous heat exchange systems consisting essentially of a material selected from the class consisting of glycols, ethers of glycols and mixtures thereof and from about 0.2 to about 10% by weight of a corrosion-inhibiting additive, said additive consisting essentially of a condensation product of an organic compound and a borate compound, said organic compound being selected from the class consisting of glycols containing from 2 to 6 carbon atoms and mixtures of glycols containing from 2 to 6 carbon atoms with monoalkyl ethers of glycols containing from 2 to 6 carbon atoms, and the alkyl group of said monoalkyl ethers containing from 1 to 4 carbon atoms, said borate compound being selected from the group consisting of alkali metal tetraborates and metaborates and alkaline earth metal tetraborates and metaborates, the molar ratio of organic compound to borate compound in said condensation product being from about 3:1 to about 12:1, the water content of said condensation product not substantially exceeding the water formed in condensation of said compounds, and said condensation product being a substantially homogeneous and readily pourable liquid at a temperature less than about 100° C.

6. The method of operating a fluid hydraulic system which comprises transmitting power in said hydraulic system by the use of a substantially non-corrosive organic hydraulic fluid, said fluid consisting essentially of a material selected from the group consisting of glycols, ethers of glycols, mixtures of glycols, mixtures of ethers of glycols, and mixtures of glycols and ethers of glycols, and from about 0.2 to about 10% by weight of the condensation product of an organic compound and a borate compound, said organic compound being selected from the class consisting of glycols containing from two to six carbon atoms and mixtures of glycols containing from two to six carbon atoms with monoalkyl ethers of glycols containing from two to six carbon atoms, the alkyl group of said monoalkyl ethers containing from one to four carbon atoms, said borate compound being selected from the group consisting of alkali metal tetraborates and metaborates and alkaline earth metal tetraborates and metaborates, the molar ratio of organic compound to borate compound in said condensation product being from about three to one to about twelve to one, the water content of said condensation product not substantially exceeding the water formed in condensation of said compounds, and said condensation product being a substantially homogeneous and readily pourable liquid at a temperature less than about 100° C.

References Cited in the file of this patent

UNITED STATES PATENTS

| 2,084,261 | Boughton | June 15, 1937 |
| 2,345,586 | Clark | Apr. 4, 1944 |